United States Patent
Kanbe et al.

(10) Patent No.: US 6,759,109 B2
(45) Date of Patent: Jul. 6, 2004

(54) PROCESS FOR MANUFACTURING A MULTILAYER RUBBER HOSE AND A PRODUCT THEREOF

(75) Inventors: Shinobu Kanbe, Komaki (JP); Takahiro Nishiyama, Kasugai (JP); Hideki Shinohara, Komaki (JP)

(73) Assignee: Tokai Rubber Industries, Ltd., Komaki ( * ) Notice: Subject to any disclaimer, the term of this patent is extended or adjusted under 35 U.S.C. 154(b) by 456 days.

(21) Appl. No.: 09/962,073

(22) Filed: Sep. 26, 2001

(65) Prior Publication Data

US 2002/0061376 A1 May 23, 2002

(30) Foreign Application Priority Data

Sep. 28, 2000 (JP) .......................................... 2000-300594

(51) Int. Cl.⁷ .......................... B29D 22/00; B29C 47/00
(52) U.S. Cl. ....................... 428/36.8; 138/137; 138/140; 138/141; 264/150; 264/171.12; 264/171.26; 264/174.11; 264/176.1; 264/209.1; 264/211.12; 264/211.2
(58) Field of Search .......................... 428/36.8; 138/137, 138/140, 141; 264/150, 171.12, 171.26, 174.11, 176.1, 209.1, 211.12, 211.2

(56) References Cited

U.S. PATENT DOCUMENTS

| | | | |
|---|---|---|---|
| 5,996,642 A | 12/1999 | Noone et al. | 138/137 |
| 6,261,657 B1 * | 7/2001 | Ainsworth et al. | 428/36.91 |
| 6,333,386 B1 * | 12/2001 | Nishiyama et al. | 525/213 |
| 6,391,963 B1 * | 5/2002 | Nishiyama | 524/565 |
| 6,619,329 B2 * | 9/2003 | Ikemoto et al. | 138/126 |

FOREIGN PATENT DOCUMENTS

| | | |
|---|---|---|
| JP | 04-171381 | 6/1992 |
| JP | 07-024962 | 1/1995 |
| JP | 11-300892 | 11/1999 |
| JP | 11-304058 | 11/1999 |

OTHER PUBLICATIONS

U.S. patent application Ser. No. 09/604,580, Miyajima et al., filed Jun. 27, 2000.
U.S. patent application Ser. No. 09/604,581, Nishiyama et al., filed Jun. 27, 2000.
U.S. patent application Ser. No. 09/831,903, Nishiyama, May 25, 2001.

* cited by examiner

Primary Examiner—Stephen J. Lechert, Jr.
(74) Attorney, Agent, or Firm—Jacobson Holman PLLC

(57) ABSTRACT

A rubber hose having a multilayer wall is formed of an inner layer of NBR type rubber having a high AN content, available at a low cost and highly impermeable to fuel and an outer layer of a rubber composition having a minimum Mooney viscosity of 25 to 65 at its curing temperature and highly resistant to flattening. Those layers are extruded and cured together without the aid of any mandrel owing to the inside diameter and wall thickness of the hose and the thickness of the outer layer which fall within specific ranges. This process enables the manufacture of a fuel hose having a high fuel impermeability at a low cost, while protecting its inner wall effectively from flattening during curing.

19 Claims, 1 Drawing Sheet

PROCESS FOR MANUFACTURING A MULTILAYER RUBBER HOSE AND A PRODUCT THEREOF

BACKGROUND OF THE INVENTION

1. Field of the Invention

This invention relates to a process for manufacturing a multilayer rubber hose and a product thereof. More particularly, it relates to a simple and economical process which can manufacture a multilayer rubber hose having a high impermeability to fuel or a vaporized fuel from inexpensive rubber materials, and also to a product thereof.

2. Description of the Related Art

Regulations against the leakage of fuel from motor vehicles, which are similar to the SHED (Shield Housing for Evaporative Determination) in the United States, were put into force in Japan and Europe in 2000. As a result, there has been a strong demand for the improvement of fuel hoses which are highly responsible for the leakage of fuel from motor vehicles.

There is known a fuel hose having a two-layered wall formed of an inner layer of fluororubber (FKM) having a high fuel impermeability and an outer layer of a mixture of acrylonitrile-butadiene rubber and polyvinyl chloride (NBR-PVC), or epichlorohydrin rubber (ECO), as disclosed in Japanese Patent Application Laid-Open No. 171381/1992. Japanese Patent Application Laid-Open No. 304058/1999 discloses a fuel hose having a two-layered wall formed of an inner layer of a polyamide resin or fluororesin, and an outer layer of NBR-PVC or ECO. Japanese Patent Application Laid-Open No. 300392/1999 discloses a fuel hose having a three-layered wall formed of an inner layer of FKM or NBR, a middle layer of a fluororesin and an outer layer of NBR-PVC or ECO. These hoses, however, employ expensive materials, such as fluororubber, though they are improved in fuel impermeability. Moreover, the formation of a resin layer adds to the cost of manufacture.

Ordinary NBR type rubber, i.e. NBR or H-NBR or a mixture thereof with another kind of rubber, such as PVC, has been considered difficult to employ in view of the stringent regulations for fuel impermeability, though it may be inexpensive. It has, however, been found recently that NBR having a high AN content gives a high fuel impermeability. This fact indicates the possibility of making a fuel hose of high fuel impermeability from inexpensive NBR type rubber, as proposed in Japanese Patent Application Laid-Open No. 182450/1999 assigned to the same assignee as in this application.

NBR type rubber is, however, likely to have a low Mooney viscosity. The viscosity rapidly decreases particularly when it is heated for curing. It, therefore, follows that when a hose is made from NBR type rubber having a high AN content, it is likely to flatten except when it has a small inside diameter, or a large wall thickness relative to its inside diameter. In order to avoid such flattening, it is necessary to insert a mandrel into an extruded hose for curing. As is well known, the use of a mandrel for curing brings about a lower efficiency and a higher cost of production than when no mandrel is used. Thus, the known hoses of NBR type rubber having a high AN content have been unsatisfactory in cost reduction because of a still high cost of manufacture even though the cost of material may be lowered.

SUMMARY OF THE INVENTION

It is, therefore, an object of this invention to provide a process which can manufacture a fuel hose at a low cost from NBR type rubber having a high AN content. The inventors of this invention have found the following:

(1) The use of NBR type rubber having a high AN content for an inner wall layer enables the manufacture of a multilayer rubber hose of high fuel impermeability at a low cost;

(2) An outer wall layer can support the inner wall layer effectively against flattening if it is formed from an appropriate rubber composition of high flattening resistance, and extruded and cured simultaneously with the inner wall layer; and (3) The rubber composition for the outer wall layer should be selected from among those having an appropriate minimum Mooney viscosity (JIS) at its curing temperature to ensure the formation of the outer wall layer supporting the inner wall layer effectively.

According to a first aspect of this invention, there is provided a process for manufacturing a rubber hose having a multilayer wall formed of at least an inner layer of rubber and an outer layer of rubber, the process comprising the steps of extruding the inner and outer layers simultaneously without the aid of any mandrel and curing them, wherein the hose has an inside diameter not exceeding 20 mm and a wall thickness of at least 2 mm, of which at least one-third is occupied by the thickness of the outer layer, and the inner layer is of a rubber composition containing NBR or H-NBR having a high AN content, while the outer layer is of a rubber composition having a minimum Mooney viscosity of 25 to 65 at its curing temperature.

The use of NBR type rubber having a high AN content for the inner wall layer enables the manufacture of a multilayer rubber hose having a high fuel impermeability at a low cost. A wall layer formed from NBR type rubber having a high AN content is, however, likely to flatten easily under heat. A rubber hose having a wall cured in a flattened state may have a warped cross section and its joint with a metal pipe or the like may not be tight enough to prevent any leakage of fuel.

According to the first aspect of this invention, therefore, the outer wall layer of the hose is of a rubber composition having a minimum Mooney viscosity of 25 to 65 at a curing temperature, and the inner and outer wall layers are extruded and cured together, so that the outer layer may support the inner layer effectively to prevent its flattening. The inside diameter and the wall thicknesses of the hose and the thickness of the outer layer as stated above ensure that no flattening of its inner layer occur even if it may be extruded and cured without the aid of any mandrel. The process not relying upon any mandrel enables a corresponding reduction in the cost of manufacture.

The outer layer may fail to support the inner layer effectively if the hose does not satisfy any of the diameter and thickness requirements stated above. However, a hose having an inside diameter of less than 3 mm or a wall thickness over 5 mm may not be capable of conveying fuel at a satisfactorily high flow rate and may not be suitable for practical use. Moreover, any outer layer having a thickness exceeding 9/10 of the whole thickness of the wall may make the inner layer unsatisfactory in fuel impermeability.

According to a second aspect of this invention, the rubber composition forming the inner layer comprises NBR or H-NBR having an AN content of 43 to 55%, or a mixture thereof with PVC. The inner layer of the composition as defined has a particularly high fuel impermeability. Its minimum Mooney viscosity at a curing temperature is, however, so low that the outer layer may provide a particularly effective support therefor. The mixture containing PVC is, among others, preferred for its high fuel impermeability, and also as it imparts weatherability and ozone resistance to the rubber composition.

According to a third aspect of this invention, the rubber composition forming the outer layer is selected from among NBR-PVC, NBR-EPDM (a mixture of acrylonitrile-butadiene rubber and an ethylene-propylene-diene terpolymer), hydrin rubber, CPE (chloropolyethylene rubber), CR (chloroprene rubber) and CSM (chlorosulfonated polyethylene rubber) These materials are all high in weatherability and ozone, fuel and oil resistance, and available at a low cost. In this aspect, the NBR type rubber for the outer layer does not have a particularly high AN content.

According to a fourth aspect of this invention, the rubber composition forming the outer layer is a mixture containing 55 to 80% by weight of NBR having an AN content of 25 to 43% and 20 to 45% by weight of PVC. This composition is preferred for ensuring easily a minimum Mooney viscosity of 25 to 65 at a curing temperature. Moreover, it has a certain level of fuel impermeability adding to that of the inner layer, while it is high in weatherability and ozone, fuel and oil resistance.

According to a fifth aspect of this invention, the rubber composition forming the outer layer is a mixture containing 30 to 70% by weight of NBR having an AN content of 25 to 43% and 30 to 70% by weight of EPDM. This composition is preferred for the same reasons as the mixture according to the fourth aspect of this invention is. It easily ensures a minimum Mooney viscosity of 25 to 65 at a curing temperature and has a certain level of fuel impermeability adding to that of the inner layer, while it is high in weatherability and ozone, fuel and oil resistance.

According to a sixth aspect of this invention, the mixture of NBR and PVC, or NBR and EPDM further contains 10 to 40 phr (parts per hundred parts of rubber) of a plasticizer, 40 to 120 phr of carbon black having a DBP (dibutyl phthalate) absorption of at least 100 ml/100 g, and/or 15 to 70 phr of a silica type filler. The addition of a plasticizer is useful for adjusting the minimum Mooney viscosity of the composition, raising the flexibility of the outer layer and improving the characteristics of the hose at a low temperature. The addition of carbon black is useful for adjusting the minimum Mooney viscosity of the composition and raising the electrical conductivity of the hose to prevent any trouble caused by its electrical charging. The addition of a silica type filler is useful for adjusting the minimum Mooney viscosity of the composition and improving the resistance of the hose to aging under heat and deterioration by a fuel oil.

According to a seventh aspect of this invention, there is provided a rubber hose manufactured by the process according to any of the first to sixth aspects of this invention. The hose is inexpensive to manufacture, has a high fuel impermeability and is free from any defect, such as a defective appearance due to the flattening of its wall under heat at a curing temperature, or a defective seal in its joint with a metal pipe.

According to an eighth aspect of this invention, the hose is a fuel hose for a motor vehicle. It is particularly suitable as a fuel hose for a motor vehicle, though it may be useful for any other purpose.

The above and other features and advantages of this invention will become more apparent from the following description and the accompanying drawings.

DETAILED DESCRIPTION OF THE INVENTION (Multilayer Rubber Hose)

Figure 1:
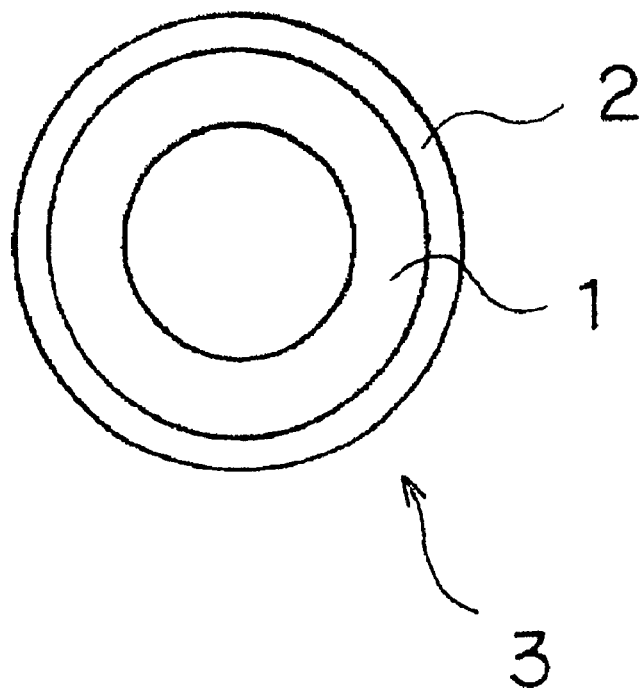
FIG. 1 is a schematic cross-sectional view of a multilayer rubber hose embodying this invention.
Figure 2:
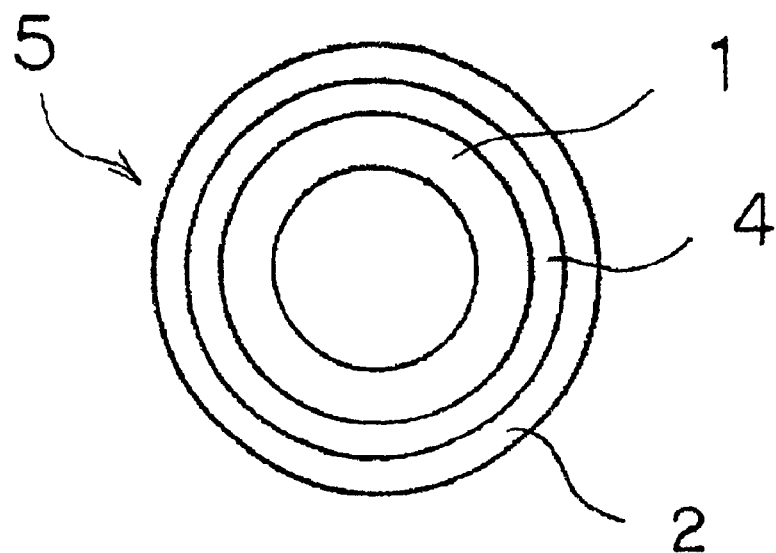
FIG. 2 is a schematic cross-sectional view of a multilayer rubber hose according to another embodiment of this invention.

The multilayer rubber hose according to this invention has a wall formed of at least an inner layer of rubber and an outer layer of rubber, though it may further include another layer, such as a middle layer of rubber or a reinforcing layer. FIG. 1 shows a hose 3 embodying this invention and having a wall formed of an inner layer 1 of rubber and an outer layer 2 of rubber, and FIG. 2 shows a hose 5 also embodying this invention and having a wall formed of an inner layer 1 of rubber, a middle layer 4 of rubber or a reinforcing material and an outer layer 2 of rubber. The inner layer of rubber usually forms the radially innermost wall layer of the hose, while the outer layer forms its radially outermost wall layer, though other structures may exist.

Though the use of the hose of this invention is not limited, it is preferably used as a fuel hose owing to its flexibility and fuel impermeability. It is used more preferably as a fuel hose for a motor vehicle, and still more preferably as a breather, or evaporation hose which is required to be highly impermeable to gasoline, or vaporized gasoline.

The hose has a certain dimensional limitation which facilitates its manufacture by extrusion and curing without the aid of any mandrel. Specifically, it is so designed as to have an inside diameter not exceeding 20 mm and a wall thickness of at least 2 mm, of which at least one-third is the thickness of the outer layer. It preferably has an inside diameter of 3 to 20 mm and a wall thickness of 2 to 5 mm, of which 1/3 to 9/10 is the thickness of the outer layer. More preferably, its wall thickness and inside diameter have a ratio (thickness:diameter) of 1:4 to 1:1.

(Inner Layer of Rubber)

The inner layer of rubber is formed from a rubber composition containing NBR or H-NBR having a high AN content in order to be highly impermeable to fuel. Its AN content is preferably at least 43%, though it may depend on the desired fuel impermeability. An AN content over 55% may, however, be undesirable as it is likely to bring about too low a Mooney viscosity at a curing temperature.

The rubber composition preferably comprises NBR or H-NBR having an AN content of 43 to 55%, or a mixture thereof with another kind of rubber. A mixture thereof with PVC is, among others, preferred. The composition may further contain any of various kinds of known additives, such as a plasticizer, process oil, a vulcanizing agent or accelerator, carbon black and a white reinforcing agent if they do not seriously affect the fuel impermeability of the layer. The composition may have a minimum Mooney viscosity in the range of, say, 10 to 50, and particularly in the lower part of that range, at a curing temperature.

(Outer Layer of Rubber)

The outer layer of rubber is formed from a rubber composition having a minimum Mooney viscosity of 25 to 65 at a curing temperature, as determined in accordance with the JIS requirements. The curing temperature depends on the rubber compositions forming the inner and outer layers and the curing system employed, but is usually the higher of the optimum curing temperatures for the rubber compositions forming the inner and outer layers, insofar as the inner and outer layers are cured simultaneously. It is often about 150° C.

The broad viscosity range of 25 to 65 has been determined in connection with the dimensional limitations of the hose, i.e. the inside diameter not exceeding 20 mm, a wall thickness of at least 2 mm, etc. If the hose satisfies those limitations, there is no flattening thereof under heat for curing if the rubber composition for the outer layer has a minimum Mooney viscosity of at least 25 at the curing temperature. The rubber composition preferably has a minimum Mooney viscosity close to its upper limit of 65 if the hose has an inside diameter close to its upper limit of 20 mm or a wall thickness close to its lower limit of 2 mm, or if the outer layer has a thickness close to its lower limit equal to one-third of the wall thickness of the hose. A composition having a minimum Mooney viscosity exceeding 65 may have difficulty in extrusion. It will be possible to use a composition having a minimum Mooney viscosity closer to its lower limit of 25 as the inside diameter or wall thickness of the hose, or the thickness of its outer wall layer becomes farther from its upper or lower limit stated above. It is preferable for the reasons stated before in connection with the first aspect of this invention that the hose have an inside diameter of at least 3 mm and a wall thickness not exceeding 5 mm, while the outer layer has a thickness not exceeding 9/10 of the wall thickness of the hose.

The outer layer is preferably formed from a mixture of NBR and PVC, a mixture of NBR and EPDM, hydrin rubber, CPE, CR or CSM, though it may also be of other materials. In its mixture with PVC or EPDM, NBR does not have a high AN content (e.g. exceeding 43%).

Two compositions are, among others, preferred for the outer layer. One of them is a mixture containing 55 to 80% by weight of NBR having an AN content of 25 to 43% and 20 to 45% by weight of PVC, and the other is a mixture containing 30 to 70% by weight of NBR having an AN content of 25 to 43% and 30 to 70% by weight of EPDM. Each mixture preferably contains 10 to 40 phr of a plasticizer, 40 to 120 phr of carbon black having a DBP (dibutyl phthalate) absorption of at least 100 ml/100 g, and/or 15 to 70 phr of a silica type filler. A preferred plasticizer is of the ether-ester type. Specific examples are ADEKA CIZER RS-107 (tradename) and ADEKA CIZER RS-540 (tradename), both of Asahi Denka Kogyo K. K. A preferred form of carbon black (CB) has a relatively small particle diameter, a large structure and a high level of electrical conductivity, though not limited thereto. NIPSIL VN3 of Nippon Silica Co. is a preferred example of silica type fillers.

The rubber composition for the outer layer may further contain any of various kinds of other known additives, such as process oil and a vulcanizing agent or accelerator, if they do not seriously affect the composition.

(Manufacturing Process)

The rubber compositions for an inner and an outer layer, respectively, are extruded and cured together at an appropriate temperature without the aid of any mandrel to form the wall of a hose. In case a middle layer of rubber is provided between the inner and outer layers, all layers are extruded and cured together. No flattening of the inner layer occurs during the extrusion or curing step despite its material having a low Mooney viscosity, since it is supported by the outer layer.

Specific methods for extrusion and curing without the aid of any mandrel are known in the art. For example, a hose having a multilayer wall formed by the simultaneous extrusion of the materials for its layers is coiled on a circular plate, is placed with the plate in a vulcanizer and is cured at an appropriate temperature. Then, it is removed from the vulcanizer and cut into hoses of the desired length. According to another example, a hose having a multilayer wall formed by the simultaneous extrusion of the materials for its layers is cut into hoses of a long size, and the cut hoses are laid on a plate having a multiplicity of grooves formed in a corrugated pattern so as to lie along those grooves. They are placed with the plate in a vulcanizer and cured at an appropriate temperature, and after their removal from the vulcanizer, each hose is cut into products of the desired length.

The curing conditions are, for example, for about 5 to 90 minutes at 130° C. to 180° C., though they may vary with the rubber compositions involved and the vulcanizing system employed.

EXAMPLES (Preparation of Hoses)

Multilayer rubber hoses were prepared as Examples 1 to 12 embodying this invention and Comparative Examples 1 to 8 with their dimensional and other features shown in Table 4. Every hose had a two-layer wall formed of an inner and an outer layer as shown in FIG. 1. The rubber composition used to form the inner wall layer of each hose is shown by one of the symbols A to G in Table 4 and each of the symbols A to G represents one of the compositions shown in Table 1, in which the proportions of various materials are shown by parts by weight. Each composition or symbol is accompanied by its minimum Mooney viscosity (Vm) as determined at its curing temperature of 150° C. in accordance with the JIS K6300 requirements. The rubber composition used to form the outer wall layer of each hose is shown by one of the numerals (1) to (8) in Table 4 and each of the numerals (1) to (8) represents one of the compositions shown in Table 2, in which the proportions of various materials are shown by parts by weight. Each composition or symbol is accompanied by its minimum Mooney viscosity (Vm) as determined at its curing temperature of 150° C. in accordance with the JIS K6300 requirements. In Tables 1 and 2, DBCA means dibutyl carbitol adipate, TMTD means tetramethylthiuramdisulfide, CBS means N-cyclohexyl-2-benzothiazolylsulfenamide, DOP means dioctyl phthalate, and ETU means ethylenethiourea.

The AN content of each NBR type rubber, the weight percentage of rubber mixed with NBR type rubber and the DBP (dibutyl phthalate) absorption of carbon black are listed in Table 3 showing also the tradename of each rubber or material and its manufacturer. The mixtures "NBR and PVC-2" and "NBR and PVC-3" were prepared by the inventors of this invention. In Table 4, Vm means the minimum Mooney viscosity.

The rubber compositions used to form the inner and outer wall layers, respectively, of each hose were kneaded by a Banbury mixer and two rolls, and extruded together by a twin-screw extruder. The inside diameter and wall thickness of each hose and the ratio in thickness of its inner and outer layers are shown in Table 4. Each hose extruded with a length of 100 m was coiled on a circular plate, placed with the plate in a vulcanizer, allowed to undergo 30 minutes of steam vulcanization at a temperature of 150° C., and removed from the vulcanizer to yield the hose according to each Example or Comparative Example.

(Evaluation)

Each hose was evaluated for its sectional roundness and gasoline impermeability.

(Roundness)

Each hose was left to stand at an ordinary room temperature for several hours after curing to stabilize in shape. Then, its longest and shortest outside diameters a and b were measured, and compared with each other. The results of evaluation are shown in Table 4. Each circle means a good result indicated by a b/a value of 0.8 or above, while each x means a bad result indicated by a b/a value of less than 0.8.

(Gasoline Impermeability)

Each hose cut into an appropriate length was filled with Phase II gasoline, which is a special type of gasoline used for a gasoline impermeability test. It was closed tightly at both ends, and allowed to undergo 168 hours of aging under heat at a temperature of 40° C. Then, it was emptied, and filled with a fresh supply of Phase II gasoline, and its whole weight W0 was immediately measured. Then, it was allowed to undergo 72 hours of aging under heat at a temperature of 40° C., and its whole weight W1 was measured immediately thereafter.

The values of weights W0 and W1 were used to calculate the gasoline permeation factor (mg·mm/cm$^2$/day) of the hose in accordance with the following equation:

$$\text{Gasoline permeation factor} = (W0 - W1) \times \beta / \alpha / 3$$

where $\alpha$ stands for the inner surface area (cm$^2$) of the hose which was in contact with the gasoline, and $\beta$ stands for the wall thickness (mm) of the hose.

The results are shown in Table 4. Each circle means a high impermeability indicated by a gasoline permeation factor not exceeding 20, while each x means a low impermeability indicated by a factor exceeding 20.

TABLE 1

|  | A | B | C | D | E | F | G |
| --- | --- | --- | --- | --- | --- | --- | --- |
| NBR-1 | 100 | 100 | — | — | — | 100 | — |
| NBR-2 | — | — | 100 | 100 | — | — | — |
| NBR-3 | — | — | — | — | — | — | 100 |
| H-NBR | — | — | — | — | 100 | — | — |
| Zinc oxide | 5 | 5 | 5 | 5 | 5 | 5 | 5 |
| Stearic acid | 1 | 1 | 1 | 1 | 1 | 1 | 1 |
| Antioxidant | 2 | 2 | 2 | 2 | 2 | 2 | 2 |
| FEF-HS carbon black | — | — | — | 60 | 60 | — | 60 |
| MAF carbon black | 60 | 30 | 60 | — | — | 20 | — |
| Plasticizer (DBCA) | 30 | 30 | 30 | 10 | 30 | 30 | 3 |
| Sulfur | 0.5 | 0.5 | 0.5 | 0.5 | 0.5 | 0.5 | 0.5 |
| Accelerator TMTD | 1.5 | 1.5 | 1.5 | 1.5 | 1.5 | 1.5 | 1.5 |
| Accelerator CBS | 1.5 | 1.5 | 1.5 | 1.5 | 1.5 | 1.5 | 1.5 |
| Minimum Mooney viscosity | 20 | 12 | 25 | 48 | 25 | 8 | 60 |

TABLE 2

|  | (1) | (2) | (3) | (4) | (5) | (6) | (7) | (8) |
| --- | --- | --- | --- | --- | --- | --- | --- | --- |
| NBR · PVC-1 | 100 | 100 | — | — | — | — | 100 | 100 |
| NBR · PVC-2 | — | — | 100 | — | — | — | — | — |
| NBR · PVC-3 | — | — | — | — | — | 100 | — | — |
| NBR · EPDM | — | — | — | 100 | — | — | — | — |
| GECO | — | — | — | — | 100 | — | — | — |
| Zinc oxide | 5 | 5 | 5 | 5 | — | 5 | 5 | 5 |
| Red lead | — | — | — | — | 5 | — | — | — |
| Stearic acid | 1 | 1 | 1 | 1 | 1 | 1 | 1 | 1 |
| Antioxidant | 2 | 2 | 2 | 2 | 2 | 2 | 2 | 2 |
| MAF carbon black | 10 | 60 | 60 | 60 | 60 | 60 | — | 60 |
| SRF carbon black | — | — | — | — | — | — | 60 | — |
| Silica | 50 | — | — | — | — | — | — | — |
| Plasticizer (DBCA) | 20 | 20 | 20 | — | 10 | 20 | 20 | 40 |
| Plasticizer (DOP) | — | — | — | 20 | — | — | — | — |
| Sulfur | 0.5 | 0.5 | 0.5 | 0.5 | — | 0.5 | 0.5 | 0.5 |
| Accelerator TMTD | 1.5 | 1.5 | 1.5 | 1.5 | — | 1.5 | 1.5 | 1.5 |
| Accelerator CBS | 1.5 | 1.5 | 1.5 | 1.5 | — | 1.5 | 1.5 | 1.5 |
| Plasticizer ETU | — | — | — | — | 1 | — | — | — |
| Minimum Mooney viscosity | 35 | 32 | 28 | 50 | 62 | 20 | 22 | 20 |

TABLE 3

| | | | |
|---|---|---|---|
| NBR-1 | AN content = 50% | NIPOL DN003 | Product of Nippon Zeon Co., Ltd. |
| NBR-2 | AN content = 42% | NIPOL DN101 | Product of Nippon Zeon Co., Ltd. |
| NBR-3 | AN content = 34% | NIPOL DN212 | Product of Nippon Zeon Co., Ltd. |
| H-NBR | AN content = 44% | ZETPOL 1020 | Product of Nippon Zeon Co., Ltd. |
| NBR · PVC-1 | AN content = 34% PVC = 30% | NIPOL 1203JN | Product of Nippon Zeon Co., Ltd. |
| NBR · PVC-2 | AN content = 41% PVC = 30% | | |
| NBR · PVC-3 | AN content = 46% PVC = 30% | | |
| NBR · EPDM | ANcontent = 41% EPDM = 40% | NE61 | Product of JSR |
| GECO | | ZECRON 3105 | Product of Nippon Zeon Co., Ltd. |
| FEF-HS carbon | DBP(DIBUTYL PHTHALATE) ABSORPTION = 180[ml/100 g] | ASAHI F-200 | Product of Asahi Carbon Co., Ltd. |
| MAF carbon | DBP(DIBUTYL PHTHALATE) ABSORPTION = 133[ml/100 g] | SEAST 116 | Product of Tokai Carbon Co., Ltd. |
| SRF carbon | DBP(DIBUTYL PHTHALATE) ABSORPTION = 68[ml/100 g] | SEAST S | Product of Tokai Carbon Co., Ltd. |
| Silica | (White reinforcing agent) | NIPSIL VN3 | Silica type filler, product of Nippon Silica |

TABLE 4

| | Composition | | | | Hose dimensions | | | Evaluation | |
|---|---|---|---|---|---|---|---|---|---|
| | Inner layer | Vm | Outer layer | Vm | ID | Wall thickness | Ratio in thickness of inner/outer layer | Roundness | Impermeability |
| Example 1 | A | 20 | (1) | 35 | 15 | 3 | 1/1 | ○ | ○ |
| Example 2 | A | 20 | (2) | 32 | 15 | 3 | 1/1 | ○ | ○ |
| Example 3 | A | 20 | (3) | 28 | 15 | 3 | 1/1 | ○ | ○ |
| Example 4 | B | 12 | (3) | 28 | 15 | 3 | 1/1 | ○ | ○ |
| Example 5 | C | 25 | (3) | 28 | 15 | 3 | 1/1 | ○ | ○ |
| Example 6 | D | 48 | (3) | 28 | 15 | 3 | 1/1 | ○ | ○ |
| Example 7 | E | 25 | (3) | 28 | 15 | 3 | 1/1 | ○ | ○ |
| Example 8 | A | 20 | (4) | 50 | 15 | 3 | 1/1 | ○ | ○ |
| Example 9 | A | 20 | (5) | 62 | 15 | 3 | 1/1 | ○ | ○ |
| Example 10 | A | 20 | (2) | 32 | 20 | 2.5 | 1/1 | ○ | ○ |
| Example 11 | A | 20 | (2) | 32 | 15 | 3 | 2/1 | ○ | ○ |
| Example 12 | A | 20 | (2) | 32 | 15 | 3 | 1/2 | ○ | ○ |
| Comp. Ex. 1 | F | 8 | (2) | 32 | 15 | 3 | 1/1 | X | ○ |
| Comp. Ex. 2 | G | 60 | (2) | 32 | 15 | 3 | 1/1 | ○ | X |
| Comp. Ex. 3 | A | 20 | (6) | 20 | 15 | 3 | 1/1 | X | ○ |
| Comp. Ex. 4 | A | 20 | (7) | 22 | 15 | 3 | 1/1 | X | ○ |
| Comp. Ex. 5 | A | 20 | (8) | 20 | 15 | 3 | 1/1 | X | ○ |
| Comp. Ex. 6 | A | 20 | (2) | 32 | 30 | 3 | 1/1 | X | ○ |
| Comp. Ex. 7 | A | 20 | (1) | 35 | 15 | 3 | 3/1 | X | ○ |
| Comp. Ex. 8 | A | 20 | (2) | 32 | 15 | 3 | 1/3 | ○ | X |

While the invention has been described by way of its preferred embodiments, it is to be understood that variations or modifications may be easily made by those skilled in the art without departing from the scope of this invention which is defined by the appended claims.

What is claimed is:

1. A process for manufacturing a rubber hose having a multilayer wall formed of at least an inner layer of rubber and an outer layer of rubber, the process comprising the steps of extruding the inner and outer layers simultaneously without the aid of any mandrel and curing them together, wherein the hose has an inside diameter not exceeding 20 mm and a wall thickness of at least 2 mm, of which at least one-third is occupied by the thickness of the outer layer, and the inner layer is of a rubber composition containing acrylonitrile-butadiene rubber (NBR) or H-NBR having a high AN content, while the outer layer is of a rubber composition having a minimum Mooney viscosity of 25 to 65 at a curing temperature.

2. The process according to claim 1, wherein the hose further includes a middle layer of rubber and a reinforcing layer, and at least the inner layer, the middle layer and the outer layer are extruded simultaneously without the aid of any mandrel and cured together.

3. The process according to claim 1, wherein the hose is a fuel hose.

4. The process according to claim 1, wherein the hose is a breather or evaporation hose for a motor vehicle.

5. The process according to claim 1, wherein the inside diameter of the hose is from 3 to 20 mm and its wall thickness is from 2 to 5 mm, from one-third to 9/10 of its wall thickness being occupied by the thickness of the outer layer.

6. The process according to claim 1, wherein the rubber composition forming the inner layer is selected from the group consisting of acrylonitrile-butadiene rubber (NBR) or H-NBR having an AN content of at least 43% and a mixture thereof with a different kind of rubber.

7. The process according to claim 6, wherein the AN content is from 43 to 55%.

8. The process according to claim 6, wherein the rubber composition forming the inner layer is a mixture of the NBR or H-NBR with polyvinyl chloride.

9. The process according to claim 1, wherein the rubber composition forming the inner layer further contains at least one additive selected from the group consisting of a plasticizer, process oil, a vulcanizing agent, a vulcanizing accelerator, carbon black and a white reinforcing agent.

10. The process according to claim 1, wherein the curing temperature is 150° C.

11. The process according to claim 1, wherein the rubber composition forming the outer layer is selected from the group consisting of a mixture of acrylonitrile-butadiene rubber (NBR) and polyvinyl chloride (PVC), a mixture of NBR and an ethylene-propylene-diene terpolymer (EPDM), hydrin rubber, chloropolyethylene rubber (CPE), chloroprene rubber (CR) and chlorosulfonated polyethylene rubber (CSM).

12. The process according to claim 11, wherein the acrylonitrile-butadiene rubber in the NBR.PVC or NBR.EPDM has an AN content of less than 43%.

13. The process according to claim 1, wherein the rubber composition forming the outer layer is a mixture containing 55 to 80% by weight of acrylonitrile-butadiene rubber having an AN content of 25 to 43% and 20 to 45% by weight of polyvinyl chloride.

14. The process according to claim 13, wherein the mixture further contains at least one additive selected from the group consisting of 10 to 40 phr of a plasticizer, 40 to 120 phr of carbon black having a DBP (dibutyl phthalate) absorption of at least 100 ml/100 g and 15 to 70 phr of a silica type filler.

15. The process according to claim 1, wherein the rubber composition forming the outer layer is a mixture containing 30 to 70% by weight of acrylonitrile-butadiene rubber having an AN content of 25 to 43% and 30 to 70% by weight of an ethylene-propylene-diene terpolymer.

16. The process according to claim 15, wherein the mixture further contains at least one additive selected from the group consisting of 10 to 40 phr of a plasticizer, 40 to 120 phr of carbon black having a DBP (dibutyl phthalate) absorption of at least 100 ml/100 g and 15 to 70 phr of a silica type filler.

17. The process according to claim 1, wherein the extruding and curing steps are followed by cutting the hose into a desired length.

18. The process according to claim 1, wherein the hose is cut into a long size prior to said curing, and cut into a desired length after said curing.

19. A multilayer rubber hose manufactured by the process according to claim 1.

* * * * *